(12) United States Patent
Zhang

(10) Patent No.: US 7,539,690 B2
(45) Date of Patent: May 26, 2009

(54) DATA MINING METHOD AND SYSTEM USING REGRESSION CLUSTERING

(75) Inventor: Bin Zhang, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 912 days.

(21) Appl. No.: 10/694,367

(22) Filed: Oct. 27, 2003

(65) Prior Publication Data

US 2005/0091189 A1     Apr. 28, 2005

(51) Int. Cl.
G06F 7/00 (2006.01)
G06F 17/00 (2006.01)

(52) U.S. Cl. .............................. 707/101; 707/7; 707/10; 707/100; 707/102; 707/200

(58) Field of Classification Search ................. 702/181, 702/179
See application file for complete search history.

(56) References Cited

U.S. PATENT DOCUMENTS

| | | | |
|---|---|---|---|
| 5,963,940 A * | 10/1999 | Liddy et al. ..................... 707/5 |
| 6,269,376 B1 | 7/2001 | Dhillon et al. | |
| 6,374,251 B1 | 4/2002 | Fayyad et al. | |
| 6,556,992 B1 * | 4/2003 | Barney et al. ................... 707/6 |
| 6,633,772 B2 * | 10/2003 | Ford et al. ..................... 600/345 |
| 6,766,316 B2 * | 7/2004 | Caudill et al. ................... 707/3 |
| 6,895,411 B2 * | 5/2005 | Keller ........................... 707/200 |
| 6,941,163 B2 * | 9/2005 | Ford et al. ..................... 600/347 |
| 7,022,067 B2 * | 4/2006 | Glukhovsky et al. .......... 600/109 |
| 2002/0129038 A1 | 9/2002 | Cunningham | |
| 2003/0115192 A1 * | 6/2003 | Kil et al. ....................... 707/3 |
| 2003/0145000 A1 * | 7/2003 | Arning et al. ................... 707/3 |
| 2003/0182082 A1 * | 9/2003 | Keller et al. ................... 702/179 |
| 2003/0236659 A1 * | 12/2003 | Castellanos .................... 704/4 |
| 2004/0019466 A1 * | 1/2004 | Minor et al. ................... 702/190 |
| 2004/0024773 A1 * | 2/2004 | Stoffel et al. .................. 707/102 |

OTHER PUBLICATIONS

K-Harmonic Means—A Data Clustering Algorithm, Bin Zhang et al., Software Technology Laboratory, HP Laboratories Palo Alto, HPL-1999-124, Oct. 1999.*
Generalized K-Harmonic Means—Boosting in Unsupervised Learning, Bin Zhang, Hewlett-Packard Laboratories Technical Report, HPL-2000-137, Oct. 2000.*
"Categorizing Visitors Dynamically by Fast Robust Clustering of Access Logs", Estivill-Castro et al., Proceedings of the First Asia-Pacific Conference on the Web, 2001.*
'Workshop report: large-scale parallel KDD systems', by Mohammed J. Zaki et al., ACM SIGKDD Explorations Newsletter, vol. 1, Issue 2, Jan. 2000, pp. 112-114, ISSN: 1931-0145.*
W. S. DeSarbo et al., "A Maximum Likelihood Methodology for Clusterwise Linear Regression," Journal of Classification, vol. 5, 1998, pp. 249-282.
C. Henning, "Models and Methods for Clusterwise Linear Regression," undated, pp. 1-9.
C. Henning, "Regression Fixed Point Clusters: Motivation, Consistency and Simulations," Feb. 20, 2000, pp. 1-49.

* cited by examiner

*Primary Examiner*—Tim Vo
*Assistant Examiner*—Jay A Morrison

(57) ABSTRACT

A method and a system are provided which regressively cluster datapoints from a plurality of data sources without transferring data between the plurality of data sources. In addition, a method and a system are provided which mine data from a dataset by iteratively applying a regression algorithm and a K-Harmonic Means performance function on a set number of functions derived from the dataset.

22 Claims, 2 Drawing Sheets

DATA MINING METHOD AND SYSTEM USING REGRESSION CLUSTERING

BACKGROUND

1. Field of the Invention

The present disclosure generally relates to data mining and, more specifically, to methods and systems for regressively clustering a dataset.

2. Background Information

With the increase in the amount of data being stored in databases as well as the number of database applications in business and the scientific domain, the need to efficiently and accurately analyze data is increasing. The term "data mining," may be used to describe such an analysis of data and may be referred to herein as the process of identifying and interpreting patterns in databases. Quick and accurate data mining may offer a variety of benefits for applications in which data is accumulated. For example, a better understanding of demand curves within a market may help a business to design multiple models of a product family for different segments of the market. Similarly, the design of marketing campaigns and purchase incentive offerings may be more effective when employed for a proper segmentation of customers, rather than being blindly presented to all customers. In any case, data may, in some embodiments, be stored at a variety of locations. For example, sales data for a business may be stored at regional locations. In order to mine the data as a whole, large memory applications may be needed to gather and process the data, particularly when a large amount of data is distributed across a plurality of sources.

Consequently, it would be advantageous to develop systems and methods for mining data. In particular, it would be advantageous to develop methods and systems for mining data from datasets distributed across a plurality of locations.

BRIEF SUMMARY

The problems outlined above may be in large part addressed by a method and a system which regressively cluster datapoints from a plurality of data sources without transferring data between the plurality of data sources. In addition, a method and a system are provided which mine data from a dataset by iteratively applying a regression algorithm and a K-Harmonic Means performance function on a set number of functions derived from the dataset.

BRIEF DESCRIPTION OF THE DRAWINGS

For a detailed description of the exemplary embodiments of the invention, reference will now be made to the accompanying drawings in which.

Figure 1:
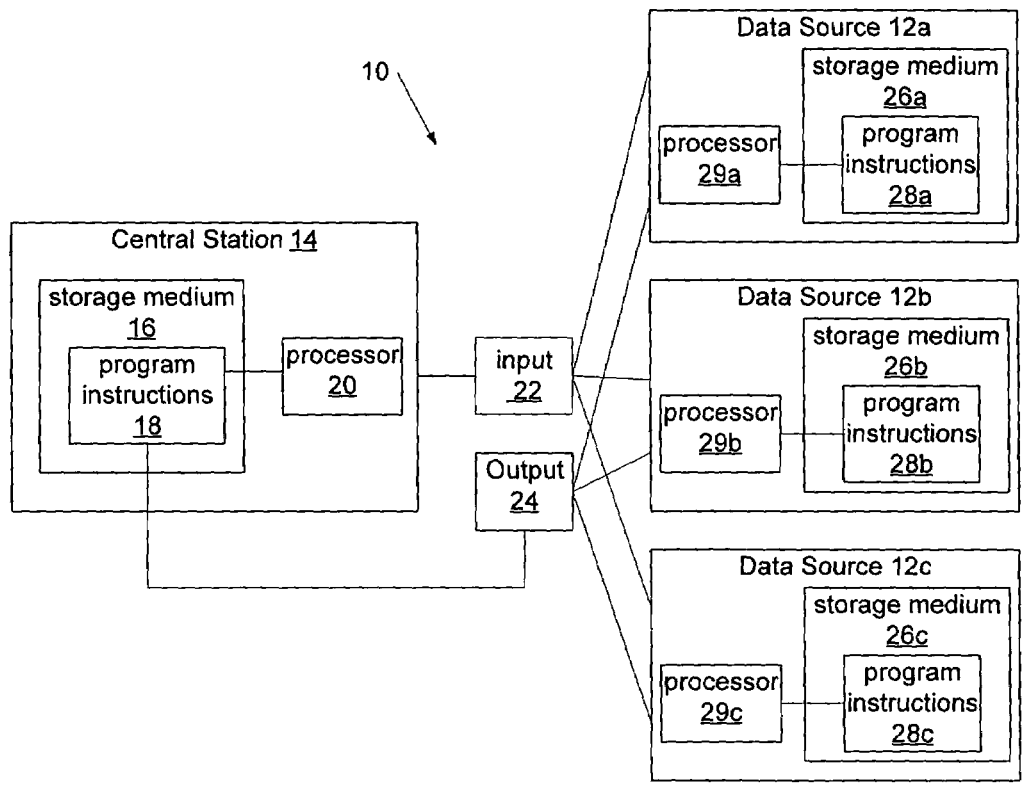
FIG. 1 depicts a schematic diagram of a system for regressively clustering datapoints from a plurality of data sources.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections. In addition, the term, "data mining," as used herein, may generally refer to the process of identifying and interpreting patterns in databases.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 2:
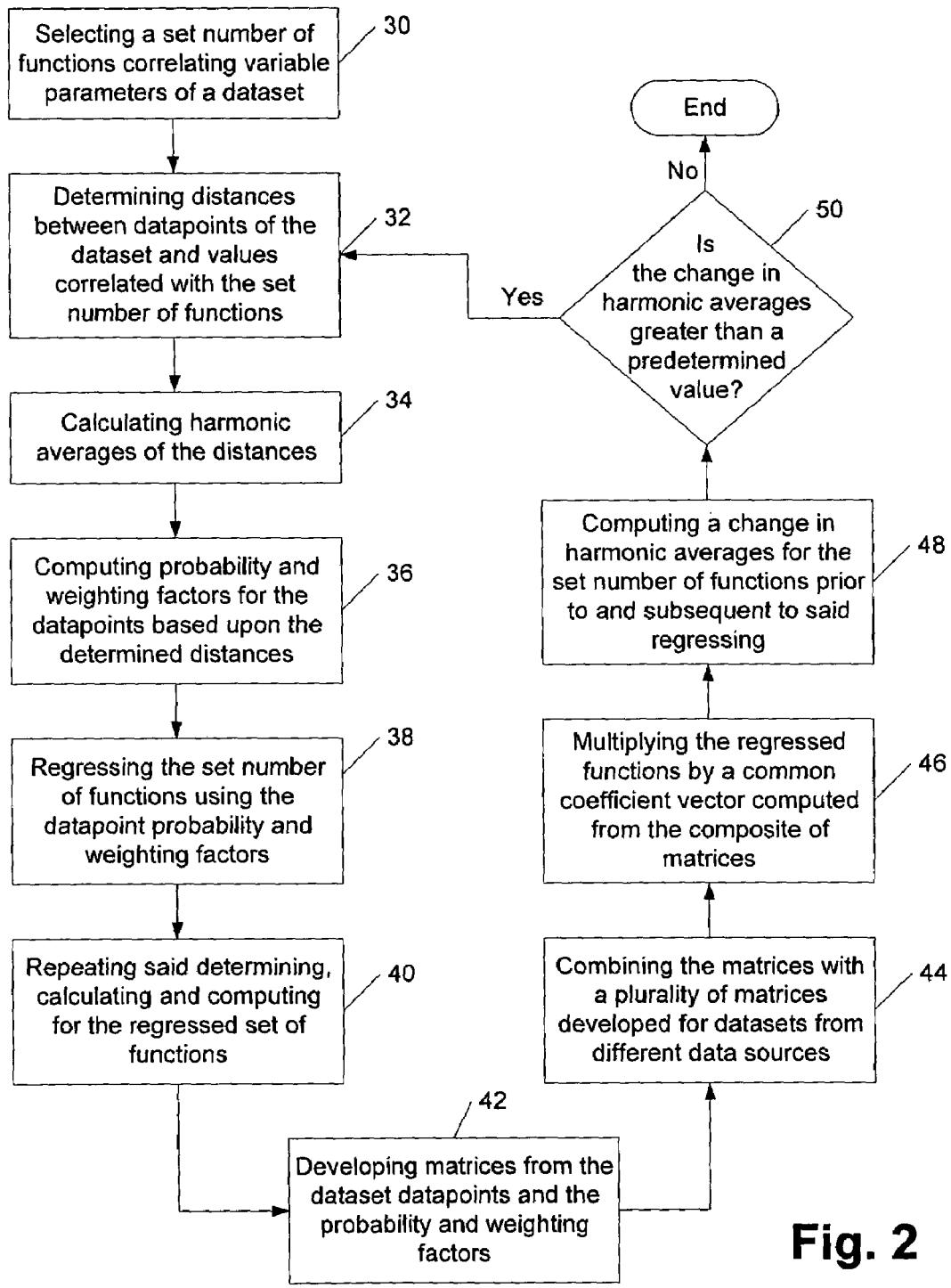
FIG. 2 depicts a flow chart of a method for mining data.

Turning now to the drawings, exemplary embodiments of systems and methods for mining data from one or more datasets by iteratively applying a regression algorithm and a clustering performance function on each of the datasets are provided. In particular, system 10 is shown in FIG. 1 and is configured to regressively cluster datapoints from a plurality of data sources 12a-12c without transferring data between the plurality of data sources. More specifically, system 10 is configured to regressively cluster one or more datasets within each of data sources 12a-12c individually and, in some embodiments, in parallel. As will be discussed in more detail below, an Expectation Maximization (EM) objective function, a K-Means (KM) objective function or a K-Harmonic Means (KHM) objective function may be used to regressively cluster the datasets stored within data sources 12a-12c. Each objective function offers a different approach for regressively clustering data and, therefore, at least three distinct methods are provided for which system 10 may be configured to regressively clustering data. Consequently, although an exemplary method for performing regression clustering using a K-Harmonic Means objective function is illustrated in the flowchart of FIG. 2 (discussed below), system 10 is not restricted to using such a method for regressively clustering data within data sources 12a-12c.

Regardless of the type of objective function used to regressively cluster data within data sources 12a-12c, system 10 may be configured to collect matrices from data sources 12a-12c. The matrices are representative of datapoints within the data sources. Such matrices may be used by system 10 to determine common coefficient vectors by which to alter functions within the datasets of data sources 12a-12c such that variations between similar functions of the datasets may be minimized. As a result, system 10 may be configured to mine the datasets from data sources 12a-12c as a whole. A more detailed description of the method for collecting the matrices and determining the coefficient vectors is provided below in reference to the flowchart depicted in FIG. 3.

In general, data sources 12a-12c may be representative of distributed data. Consequently, data sources 12a-12c may include similar variables by which to store information, but may have distinct sets of data. For example, each of data sources 12a-12c may include sales tracking information, such as gross and net profits, number of units sold, and advertising costs. Each of data sources 12a-12c may respectively represent different regions of the sales organization and, therefore, may have different values for each of the variables of the sales tracking information. In some embodiments, data sources 12a-12c may work independently of each other and, therefore, may not share data other than communicating to central station 14 as described in more detail below. In other embodiments, however, data sources 12a-12c may be adapted to share some or all data. Although system 10 is shown to include three data sources, system 10 may include any number of data sources, including a single data source, two data sources, or more than three data sources. As noted above, system 10 may be configured to regressively cluster the datasets within each of data sources 12a-12c individually. In some embodiments, such an adaptation may be incorporated within program instructions 18 which are executable by processor 20 of central station 14 as described in more detail below. In addition or alternatively, the adaptation to regressively cluster the datasets within each of data sources 12a-12c may be incorporated within the respective data sources. In particular, data sources 12a-12c may include storage mediums 26a-26c with program instructions 28a-28c which are executable through processors 29a-29c for regressively clustering data as described below.

As noted above, an EM, KM or KHM objective function may be used for the regression clustering (RC) process for the datasets of data sources 12a-12c. In most cases, the same regression clustering technique is used for all of data sources 12a-12c. In other words, the data within data sources 12a-12c is mined by an RC process which incorporates one of the EM, KM and KHM objective functions. In this manner, the datasets within data sources 12a-12c may be mined as a whole using the same RC process. Regarding the use of the EM, KM and KHM objective functions, three methods of regression clustering are provided herein. In each method, a set number of functions, K, may be selected from a family of functions, $\Phi$, derived from datasets having similar variables by which to store information. The functions may be selected randomly or by any heuristics that are believed to give a good start. The determination of the optimum K may include techniques used in the data mining industry for clustering.

In embodiments in which Mean-Square Error (MSE) linear regression is used in the RC process, selecting the number of K functions may further include initializing coefficients, $C_k$, of the functions $\{c_k|k=1,\ldots K\}$. As will be described in more detail below, the datasets within data sources 12a-12c are separately processed with respect to the selected K functions. Information representing the processed data is collected at a central station and $c_k$ is recalculated to compensate for the differences between each of the datasets. In general, the first set of instructions may be conducted by program instructions 18 of storage medium 16 of central station 14. In this manner, each of data sources 12a-12c may receive the same select number of functions and coefficients. Consequently, the first set of instructions may further include propagating the K number of functions and coefficients $c_k$ to data sources 12a-12c.

In addition to selecting a set number of functions, each of the regression clustering methods described herein may include applying K regression functions, M (where $M=\{f_1,\ldots,f_K\} \subset \Phi$), to the data, finding its own partition, $Z_k$, and regressing on the partition. The K regression functions are not necessarily linear. Both parts of the process, i.e., the K regressions and the partitioning of the dataset, optimize a common objective function. As will be described in more detail below, the partition of the dataset can be "hard" or "soft." A "hard" partition may refer to the designation of every datapoint within a dataset belonging to a subset. In this manner, the partitions of the datapoints may be clear and distinct. A "soft" partition, however, may refer to the ambiguous groupings of datapoints within subsets of a dataset. In some cases, such a categorization of datapoints may depend on the probability of datapoints belonging to particular subsets within the dataset rather than other subsets. Such a soft-partitioning of data is employed by the KHM and EM regression clustering method as described in more detail below.

The method of regression clustering using a K-Means objective function (referred to herein as RC-KM) solves the following optimization problem:

$$\min_{\{f_k\}\subset \Phi;\{Z_k\}} Perf_{RC-KM} = \sum_{k=1}^{K} \sum_{(x_i,y_i)\in Z_k} e(f_k(x_i), y_i) \quad (1)$$

where Z represents a dataset with supervising responses x and y (i.e., $Z=(X,Y)=\{(x_i,y_i)|i=1,\ldots,N\}$) and $$Z = \bigcup_{k=1}^{K} Z_k \quad (Z_k \cap Z_{k'} = \emptyset, k \neq k').$$

The optimal partition will satisfy:

$$Z_k=\{(x,y)\in Z|e(f_k^{opt}(x),y)\leq e(f_{k'}^{opt}(x),y) \forall k'\neq k\}, \quad (2)$$

which allows the replacement of the function in optimization problem (2) to result in:

$$Perf_{RC-KM}(Z, \{f_k\}_{k=1}^{K}) = \sum_{i=1}^{N} \text{MIN}\{e(f_k(x_i), y_i) | k = 1, \ldots, K\}. \quad (3)$$

In other words, RC-KM determines an optimal clustering of datapoints by regressing functional relationships of the datapoints to have a minimum amount of total variation or error (e).

In general, the process of RC-KM may be executed through a monotone-convergent algorithm to find a local optimum of equation (1). One example of an RC-KM algorithm may include a first set of instructions for picking a set number of functions, K, within a dataset as described above. In some embodiments, selecting the number of K functions may further include initializing coefficients, $c_k$, of the functions $\{c_k|k=1,\ldots K\}$. In general, the first set of instructions may be conducted by program instructions 18 of storage medium 16 of central station 14. Consequently, the first set of instructions may further include propagating the K number of functions and coefficient $c_k$ to data sources 12a-12c.

In addition to selecting K number of functions, the RC-KM algorithm may include a second set of instructions for repartitioning the dataset in the r-th iteration, r=1, 2, . . . , as:

$$Z_k^{(r)}\{(x,y) \in Z | e(f_k^{(r-1)}(x),y) \leq e(f_{k'}^{(r-1)}(x),y) \forall k' \neq k\}. \quad (4)$$

Such a repartitioning process facilitates a "hard" partition, as defined above. Each datapoint within the dataset may be associated with the regression function that results in the smallest approximation error. Using the RC-KM algorithm, distances between each of the datapoints and the regression functions may be determined and the errors of fitting the datapoints to the functions are compared. Algorithmically, for r>1, a data point in $Z_k^{(r-1)}$ is moved to $Z_{k'}^{(r)}$ if and only if:

a) $e(f_{k'}^{(r-1)}(x),y) < e(f_k^{(r-1)}(x),y)$ and b) $e(f_{k'}^{(r-1)}(x),y) \leq e(f_{k''}^{(r-1)}(x),y)$ for all $k'' \neq k, k'$.

$Z_k^{(r)}$ inherits all the data points in $Z_k^{(r-1)}$ that are not moved. In the event of a tie between the error functions, the datapoint may be randomly grouped in either subset.

In addition to program instructions for function selection and clustering, the RC-KM algorithm may include a third set of program instructions for running a regression optimization algorithm. In particular, the third set of instructions may include an algorithm by which to alter the selected functions to more closely represent the datapoints within the respective partitions. In some cases, variable selections for the K regressions can be done on each partition independently with the understanding that an increase in the value of the objective function could be caused by such a process. In any case, the third set of program instructions may include any regression optimization algorithm that results in the following:

$$f_k^{(r)} = \arg\min_{f \in \Phi} \sum_{(x_i, y_i) \in Z_k} e(f(x_i), y_i) \quad (5)$$

where k=1, . . . , K. In some embodiments, regularization techniques may be employed to prevent over-fitting of the converged results from the regression algorithm. In addition or alternatively, boosting techniques may be used on each partition independently to improve the quality of the converged results within each partition. In any case, the regression algorithm may be selected by the nature of the original problem or other criteria. The fact that it is included in a regression clustering process adds no additional constraint on its selection.

In order to cluster the data into the optimum partitions, the second and third set of instructions of the RC-KM algorithm may be conducted repeatedly. Optimally, such a reiterative process continues until there is no more datapoints changing their membership within the partitions. If any datapoint does change its partition membership as a result of the second and third sets of instructions, the value of the objective function in equation (1) decreases. Consequently, the value of the objective function in equation (1) continues to decrease with each membership change. As a result, the RC-KM algorithm stops in finite number of iterations.

As noted above, some clustering techniques, such as K-Means clustering methods, may be sensitive to the initialization of partition centers. Similarly, RC-KM may be sensitive to the initialization of its K functions. More specifically, the convergence of data into clusters using RC-KM may depend on how closely the initial set of K functions represent the data, since the datapoints are partitioned into distinct subsets (i.e., hard partitioned) with respect to the selected functions during each iteration of the algorithm. In general, the initialization of the K functions may be dependent on the amount of and quality of available prior information. In many instances, however, there is minimal or no prior information available regarding the functional relationship of variables within a dataset. In some cases, more than one functional relationship may be found to represent a partition of data. As a result, convergence to a distinct set of partitions may be difficult using RC-KM techniques. In other cases, however, the initialization of the K functions using RC-KM may be good and, as a result, a dataset may be clustered into an optimum set of partitions using an RC-KM algorithm.

In contrast to K-Means clustering techniques, K-Harmonic Means (KHM) clustering algorithms are generally less sensitive to the initialization of the K functions due to KHM's methods of dynamically weighting data points and its "soft" partitioning scheme. An exemplary harmonic average based clustering method is described in U.S. Pat. No. 6,584,433 to Zhang et al. and is incorporated by reference as if fully set forth herein. Similar to KHM clustering, the K-Harmonic Means regression clustering process (RC-KHM$_p$) described herein is generally less sensitive to the initialization of the K functions as discussed in more detail below. RC-KHM$_p$'s objective function is defined by replacing the MIN( ) function in equation (3) by the harmonic average function, HA( ). In addition, the error function may be represented as $e(f_k(x_i), y_i) = \|f_k(x_i) - y_i\|^p$, where $p \geq 2$. As a result, the objective function of RC-KHM$_p$ may be:

$$Perf_{RC-KHM_p}(Z, M) = \quad (6)$$

$$\sum_{i=1}^{N} \mathop{HA}_{1 \leq k \leq K} \{\|f_k(x_i) - y_i\|^p\} = \sum_{i=1}^{N} \frac{K}{\sum_{k=1}^{K} \frac{1}{\|f_k(x_i) - y_i\|^p}}$$

In general, different values of parameter p may represent different distance functions.

As noted above, an exemplary method of K-Harmonic Means regression clustering is depicted in the flowchart of FIG. 2. Such a method is described herein in reference to an exemplary algorithm for RC-KHM$_p$. As with RC-KM, RC-KHM$_p$ may be employed through an algorithm which includes a first set of instructions for selecting a set number of K functions randomly or by any heuristics that are believed to give a good start. Such a process is noted as block 30 in FIG. 2. In some embodiments, the step may further include initializing coefficients, $c_k$, of the functions $\{c_k|k=1, \ldots K\}$. In general, the first set of instructions may be conducted by program instructions 18 of storage medium 16 of central station 14. Consequently, the first set of instructions may further include propagating the K number of functions and coefficient $c_k$ to data sources 12a-12c.

As noted above, the selected functions may be a subset of a plurality of functions used to correlate variable parameters of a dataset. In contrast to the hard partitioning used in RC-HM, RC-KHM$_p$ uses a soft partitioning scheme. Consequently, datapoints may not be distinctly associated with a single function when using an RC-KHM$_p$ algorithm. Rather, the RC-KHM$_p$ process may include determining the distances between each of the datapoints and each of the functions and computing probability and weighting factors associated with such distances for each of the datapoints as noted in blocks 32 and 36 in the flowchart of FIG. 2, respectively. In turn, the RC-KHM$_p$ algorithm may include a second set of instructions to determine approximate associations of the datapoints to the K functions based upon the probability and weighting factors. The calculation of the harmonic averages noted in block 34 may be used in the objective function of RC-KHM$_p$ as noted in equation (6) above and explained in more detail below. In general, the calculations of the weighting and probability factors may be computed by program instructions 28a-28c of storage mediums 26a-26c, respectively of data sources 21a-12c. In this manner, the value of the weighting and probability factors may be dependent of the value of the local datapoints $z_i \in Z_l$ as well as the values of the "global" or "common" coefficient vectors $\{c_k | k=1, \ldots K\}$ in some cases.

In general, the probability of the i-th data point belonging to a particular k function may be computed as:

$$p(Z_k \mid z_i) = d_{i,k}^{p+q} \Big/ \sum_{l=1}^{K} d_{i,l}^{p+q}. \quad (7)$$

wherein:

$$d_{i,k} = \|f_k^{(r-1)}(x_i) - y_i\|. \quad (8)$$

The parameter q may be used to put the regression's error function as noted in equation (10) below in $L^q$-space. In addition, the parameter q may be used to reduce the association of datapoints to more than one of the selected K functions. In any case, the weighting factor for each datapoint may be computed using (i.e., each data point's participation may be weighted by):

$$a_p(z_i) = \sum_{l=1}^{K} d_{i,l}^{p+q} \Big/ \sum_{l=1}^{K} d_{i,l}^{p}. \quad (9)$$

In this manner, not all datapoints fully participate in all iterations in RC-KHM$_p$ like in RC-KM. As shown in equation (9), the value of weighting function $a_p(z_i)$ for a particular datapoint is proportional to the distance between the datapoint and the function. In particular, the value of weight function $a_p(z_i)$ is smaller when the datapoint is closer to the function than if the datapoint is farther away from the function. Weighting function $a_p(z_i)$ changes in each iteration as the regression functions are updated and, thus, is dynamic. As described above in reference to RC-KM and will be described below in reference to RC-EM, the participation of each datapoint is not weighted. As such, $a_p(z_i)$ is equal to 1 in RC-KM and RC-EM as noted below in equations (18) and (22).

As shown in block 38 in the flowchart of FIG. 2, the RC-KHM$_p$ process may include regressing K function using the probability and weight factors computed in block 36. In particular, the RC-KHM$_p$ process may run any regression optimization algorithm that results in:

$$f_k^{(r)} = \arg\min_{f \in \Phi} \sum_{i=1}^{N} a_p(z_i) p(Z_k \mid z_i) \|f(x_i) - y_i\|^q \quad (10)$$

where $k=1, \ldots, K$. For simpler notations, $p(Z_k | z_i)$ and $a_p(z_i)$ are not indexed in equation (10) by q or p. In addition, $d_{i,k}$, $p(Z_k | z_i)$, and $a_p(z_i)$ in equations (7), (8), (9) and (10) are not indexed by the iteration r to simplify notations. As in RC-KM, variable selections for the K regressions in RC-KHM$_p$ can be done on each partition independently with the understanding that an increase in the value of the objective function could be caused by such a process. In addition, regularization techniques and/or boosting techniques may be employed to improve the quality of the converged results. In any case, the regression algorithm may be selected by the nature of the original problem or other criteria. The fact that it is included in a regression clustering process adds no additional constraint on its selection.

Step 40 includes the reiteration of blocks 34, 36, and 38 for the regressed set of functions. More specifically, the RC-KHM$_p$ process involves determining the distances between each of the data points and the regressed functions, calculating harmonic averages of such distances and computing probability and weighting factors for the datapoints based upon the determined distances. Steps 42, 44, and 46 outline a method for relating the information within the dataset, such as the datapoints and the probability and weighting factors, with dataset information from other data sources. In other words, blocks 42, 44 and 46 outline a scheme for regressively clustering data distributed across several distinct data sources. In this manner, the method depicted in FIG. 2 is configured to regressively cluster distributed data in parallel and as a whole. A more detailed description of such a process is provided below in reference to FIG. 3.

Referring to block 48, the RC-KHM$_p$ process may include computing a change in harmonic averages for the K functions prior to and subsequent to the regressing process described in reference to block 38. Such a computation may be included within the objective function for RC-KHM$_p$ as cited in equation (6) above. Step 50 may be used to determine if the change in harmonic averages is greater than a predetermined value. More specifically, since there is no discrete membership change in RC-KHM$_p$, the continuation or termination of the method may be determined by measuring the changes to the RC-KHM$_p$ objective function (i.e., equation (6)). For example, in embodiments in which the change in harmonic average (i.e., the objective function) is greater than the predetermined value, the method may revert back to block 32 and determine distances between datapoints of the dataset and values correlated with the new set of functions computed from blocks 40-46. The method may subsequently follow the flow blocks 34-50 and, thus, provides an iterative process until the change in harmonic averages is reduced to a value below the predetermined level noted in block 50. As shown in FIG. 2, upon determining the change in harmonic averages (i.e., the objective function) is less than the predetermined value, the method may terminate. In particular, when the change in the objective function is less than a predetermined value, the method may stop. Alternatively, the method may be terminated when value of the objective function is less than a predetermined value.

Referring to an RC-EM process, the objective function is defined as:

$$Perf_{RC-EM}(Z, M) = -\log\left\{\prod_{i=1}^{N}\sum_{k=1}^{K}\frac{p_k}{\sqrt{(2\pi)^d|\Sigma_k|}}\text{EXP}\left(-\frac{1}{2}(f_k(x_i) - y_i)\Sigma_k^{-1}(f_k(x_i) - y_i)^T\right)\right\} \quad (11)$$

where d=dimension (Y). In the case in which d=1, $(f_k(x_i)-y_i)$ is a real number and $\Sigma_k^{-1}=1/\sigma_k^2$. An exemplary RC-EM algorithm may include a first set of instructions to select a set number of K functions, as described in reference to RC-KM and RC-KHM$_p$. In some embodiments, the first set of instructions may further include instructions for initializing coefficients, $c_k$, of the functions $\{c_k|k=1,\ldots K\}$ as described above. In general, the first set of instructions may be conducted by program instructions 18 of storage medium 16 of central station 14. Consequently, the first set of instructions may further include propagating the K number of functions and coefficient $c_k$ to data sources 12a-12c. In addition to function selection, the RC-EM algorithm may include two steps by which to regressively cluster a dataset. In particular, the RC-EM algorithm may include an expectation step (E-Step) and a maximization step (M-Step).

In general, the E-Step may be used to determine how much of each datapoint is related to each subset. Such a step may be conducted by computing a probability factor in which:

$$p(Z_k^{(r)}|z_i) = \frac{\frac{p_k^{(r-1)}}{\sqrt{|\Sigma_k|}}\text{EXP}\left(-\frac{1}{2}(f_k^{(r-1)}(x_i) - y_i)\Sigma_{r-1,k}^{-1}(f_k^{(r-1)}(x_i) - y_i)^T\right)}{\sum_{k=1}^{K}\frac{p_k^{(r-1)}}{\sqrt{|\Sigma_k|}}\text{EXP}\left(-\frac{1}{2}(f_k^{(r-1)}(x_i) - y_i)\Sigma_{r-1,k}^{-1}(f_k^{(r-1)}(x_i) - y_i)^T\right)}. \quad (12)$$

The M-Step may use such a probability factor to regress the selected functions of the dataset. In particular, the M-step may use the following equations to regress the functions of a dataset $$p_k^{(r)} = \frac{1}{N}\sum_{i=1}^{N} p(Z_k^{(r)}|z_i) \quad (13)$$

$$f_k^{(r)} = \arg\min_{f\in\Phi}\sum_{i=1}^{N} p(Z_k^{(r)}, z_i)\|f(x_i) - y_i\|^2 \quad (14)$$

$$\Sigma_{r,k} = \frac{\sum_{i=1}^{N} p(Z_k^{(r)}|z_i)(f_k^{(r)}(x_i) - y_i)^T(f_k^{(r)}(x_i) - y_i)}{N * p_k^{(r)}} \quad (15)$$

The E-Step and M-Step may be conducted in an iterative process. As with RC-KM, RC-EM may be sensitive to the initialization of functions and, consequently, may have difficultly in converging the datapoints in an optimal set of subsets in some embodiments. In other cases, however, the initialization of functions within a dataset may be good and the dataset may be clustered into an optimum set of partitions using an RC-EM algorithm.

As noted above, a system and a method are provided which are configured to regressively cluster distributed data in parallel as well as a whole. In particular, FIG. 1 illustrates system 10 which is configured to regressively cluster the data within data sources 12a-12c in parallel without transferring data between the data sources. In addition, system 10 is configured to regressively cluster the datasets within data sources 12a-12c as a whole through central station 14. As described above, the methods provided herein may include regressively clustering data through the use of one or more algorithms and, therefore, may be best implemented through a computer. Consequently, central station 14 may be a computer in some cases. In addition, the methods described herein may, in some embodiments, be referred to as a "computer-implemented methods." In other cases, however, the methods described herein may be more generally referred to as "methods." The use for the two terms is not mutually exclusive and, therefore, may be used interchangeably herein.

In general, central station 14 may be communicably coupled to data sources 12a-12c such that input 22 may be received from the data sources and output 24 may be sent to the data sources. More specifically, input 28 may be transmitted from data sources 12a-12c to central station 14 to execute program instructions 18 within storage medium 16. Similarly, input may be transmitted to data sources 12a-12c from central station 14 or any other data input source to execute program instructions 28a-28c within storage mediums 26a-26c. Storage mediums 16 and 26a-26c may include any device for storing program instructions, such as a read-only memory, a random access memory, a magnetic or optical disk, or a magnetic tape. Program instructions 18 and 28a-28c may include any instructions by which to perform the processes for RC-KM, RC-KHM and RC-EM described above. In particular, program instructions 18 and 28a-28c may include instructions for selecting a set number of functions correlating variable parameters of a dataset and other instructions for clustering the dataset through the iteration of a regression algorithm and a KM, KHM or EM performance function applied to the set number functions as described above.

Figure 3:
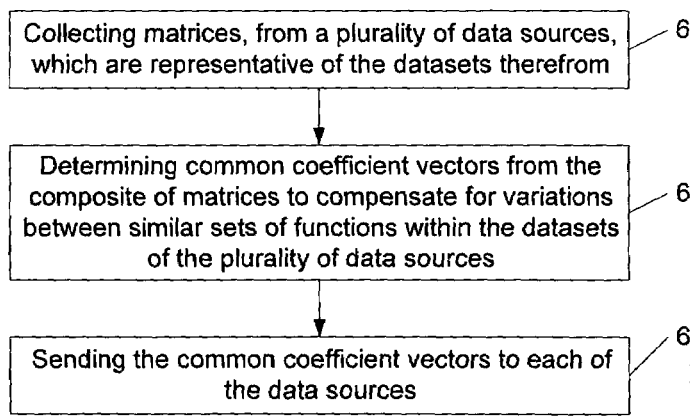
FIG. 3 depicts a flow chart of a method for compensating for variations between similar sets of functions within datasets of a plurality of data sources.

In addition, program instructions 18 and 28a-28c may include instructions for collecting dataset information from data sources 12a-12c to regressively cluster the datasets therefrom as a whole. A more detailed description of such program instructions are provided in reference to the flowchart illustrated in FIG. 3 as well as blocks 42, 44 and 46 in FIG. 2. More specifically, FIG. 3 depicts a set of processes which may be performed at central station 14 with respect clustering the datasets from data sources 12a-12c as a whole. Steps 42, 44 and 46 in FIG. 2 depict a set of step which may be performed at each of data sources 12a-12c with respect to sending and receiving information from central station 14 for the method described in reference to FIG. 3. As shown in block 42 of FIG. 2, matrices may be developed for each of data sources 12a-12c from the datapoints and the probability and weighting factors associated with the datasets therein. Such a process may be executed by program instructions 18 included within storage medium 16 of central station 14 or program instructions 28a-28c included within storage mediums 26a-26c of data sources 12a-12c.

In either case, the matrices developed from data sources 12a-12c may be set forth as $A_{l,k}$ and $b_{l,k}$, $$(A_{l,k} = \overline{X}_l^T * \text{diag}(w_{k,l}) * \overline{X}_l, b_{l,k} = \overline{X}_l^T * \text{diag}(w_{k,l}) * Y),$$
$$k = 1, \ldots, K \quad (16)$$

where the data set $(\overline{X}, Y)$ located on L data sources 12a-12c, $(\overline{X}_l, Y_l)$, $l=1,\ldots,L$, is the subset on the $l^{th}$ computer and the size of the $(\overline{X}_l, Y_l)$ is $N_l$. The diagonal matrix of $(w_{l,k}) = \text{diag}\{a(z_i)$ p($Z_k|z_i$)|i∈ subset of indices of the datapoints in the $l^{th}$ computer} with a($z_i$) and p($Z_k|z_i$) defined with the respect to the type of regression clustering technique used to cluster the dataset. In particular, a($z_i$) and p($Z_k|z_i$) may be defined as noted below with respect to using a RC-KM, RC-KHM or an RC-EM technique to cluster the data.

*RC-KM:*

$$p(Z_k|z_i) = \begin{cases} 0 & k \neq \arg\min\{\|f_{k'}(x_i) - y_i\|^2\} \\ 1 & k = \arg\min\{\|f_{k'}(x_i) - y_i\|^2\} \end{cases} \quad (17)$$

$$a(z_i) = 1 \quad (18)$$

*RC-KHM:*

$$p(Z_k|z_i) = d_{i,k}^{p+q} / \sum_{l=1}^{K} d_{i,l}^{p+q}. \quad (19)$$

$$a_p(z_i) = \sum_{l=1}^{K} d_{i,l}^{p+q} / \sum_{i=1}^{K} d_{i,l}^{p}. \quad (20)$$

*RC-EM:*

$$p(Z_k^{(r)}|z_i) = \frac{\frac{p_k^{(r-1)}}{\sqrt{|\Sigma_k|}} \text{EXP}\left(-\frac{1}{2}(f_k^{(r-1)}(x_i) - y_i)\Sigma_{r-1,k}^{-1}(f_k^{(r-1)}(x_i) - y_i)^T\right)}{\sum_{k=1}^{K} \frac{p_k^{(r-1)}}{\sqrt{|\Sigma_k|}} \text{EXP}\left(-\frac{1}{2}(f_k^{(r-1)}(x_i) - y_i)\Sigma_{r-1,k}^{-1}(f_k^{(r-1)}(x_i) - y_i)^T\right)} \quad (21)$$

$$a(z_i) = 1 \quad (22)$$

The matrices may be collected from data sources 12a-12c at central station 14 through input 22 as outlined in block 60 of FIG. 3. Consequently, the method depicted in FIG. 2 may include block 44 in which the matrices from one data source is combined with matrices from other of data sources 12a-12c. Such a transfer of information may be initiated by program instructions 18 included within central station 14 and/or program instructions 28a-28c within data sources 12a-12c. As shown FIG. 3, the method may further include block 62 in which common coefficient vectors are computed from the composite of matrices. Such a calculation may be computed at central station 14 by program instructions 18. The common coefficient vectors may be sent to data sources 12 as shown in block 64 of FIG. 3 and multiplied by the respective regression functions of each data source as noted in block 46 in FIG. 2. In general, the common coefficient vectors computed in block 62 may be used to compensate for variations between similar sets of functions within the datasets of data sources 12a-12c. More specifically, the common coefficient vectors may be used to compensate for variations between set of functions having similar response variables.

In some embodiments, a total residue error of the common coefficient vectors may be computed between iterations of the regression clustering process. In particular, the variation of $c_k$ between iterations may be calculated at central station 14 to determine whether to continue the regression clustering process. Such a computation may offer a manner in which to monitor the progress of the regression clustering process in addition to the computation of the change in harmonic averages at each of data sources 12a-12c as described above in reference to block 50. In particular, the regression clustering process may be terminated upon detecting changes in coefficient values which are less than a predetermined value. In addition, the regression clustering process may continue to block 50 upon detecting changes in the coefficient values are greater than a predetermined value. The residue error calculation may be conducted prior or subsequent to block 64 in FIG. 3 in which the coefficient vectors are sent to each of the data sources.

The optimal common coefficient vector, $c_k$, may be calculated at central station 14 by summing the matrices received from data sources 12a-12c such that $$A_k = \overline{X}^T * \text{diag}(w_k) * \overline{X} = \sum_{l=1}^{L} \overline{X}_l^T * \text{diag}(w_{k,l}) * \overline{X} \quad (23)$$

$$b_k = \overline{X}^T * \text{diag}(w_k) * Y = \sum_{l=1}^{L} \overline{X}_l^T * \text{diag}(w_{k,l}) * Y$$

$$k = 1, \ldots, K$$

and using such summed matrices to compute $c_k$ as:

$$c_k = A_k^{-1} b_k, k=1, \ldots, K. \quad (24)$$

Although such a computation does involve the transfer of information between data sources 12a-12c and central station 14, the amount of data transferred is significantly smaller than the size of each dataset on data sources 12a-12c. Choosing $\overline{D}$ functions as a basis, $A_{k,l}$ is a $\overline{D} \times \overline{D}$ matrix and $b_{k,l}$ is a $\overline{D}$ dimensional vector. The total number of floating point numbers to be transmitted from each of data sources 12a-12c to central station 14 is $\overline{D}^2 + \overline{D}$. The total size of all the coefficients $c_k$, which are transmitted back from central station 14 to all of data sources 12a-12c, is $\overline{D} \times K$ floating point numbers. All these sizes are minute compared with the size of the dataset on each of data sources 12a-12c.

Table 1 provided below includes an exemplary layout of the processes included in the RC process described herein as well as which entity (i.e., data sources 12a-12c or central station 14) may be used for each step. Such a general outline of the RC process may be applied to any of the RC techniques provided herein (i.e., RC-KM, RC-KHM and RC-EM). In some cases, the RC process may include processes other than those included in Table 1 and described above. As such, the RC process is not necessarily restricted to the process outlined in Table 1. In addition, the designation of the processes to be conducted by central station 14 or data sources 12a-12c in Table 1 may be reversed or alternatively conducted by both entities, in some embodiments.

| Calculations on Data Sources 12a-12c | Calculations on Central Station 14 |
|---|---|
| | Step 1: Initialization<br><br>a) Pick K functions $f_1^{(0)}, \ldots, f_K^{(0)} \in \Phi$ and, in some cases, initialize the coefficients $\{c_k \mid k = 1, \ldots K\}$ randomly, or by any other heuristic.<br>b) Propagate the functions/ coefficients to data sources 12a-12c. |
| Step 2: Clustering: In the r-th iteration,<br><br>a) Calculate the probability $p(Z_k \mid z_i)$ of K functions, and<br>b) Optionally, calculate the dynamic weighting factor $a(z_i)$<br>Step 3: Regression:<br><br>a) Regress the K functions with regard to the weighting and probability factors<br>b) Calculate $w_{l,k,i} = p(Z_k \mid z_i) a(z_i), z_i \in Z_l$.<br>c) Calculate<br>$A_{l,k} = \overline{X}_l^T * \text{diag}(w_{l,k}) * \overline{X}_l$,<br>$b_{l,k} = \overline{X}_l^T * \text{diag}(w_{l,k}) * Y_l, k = 1, \ldots, K$<br>d) Send information set $\{A_{l,k}, b_{l,k} \mid k = 1, \ldots, K\}$ to central station 14 | |
| | Step 4: Global Coefficient Calculation:<br><br>a) Calculate the summation:<br><br>$$A_k = \sum_{l=1}^{L} A_{l,k}$$<br>$$b_k = \sum_{l=1}^{L} b_{l,k}$$<br>, $k = 1, \ldots, K$.<br><br>b) Calculate: $A_k^{-1}, k = 1, \ldots, K$.<br>c) Calculate the global coefficients:<br>$c_k = A_k^{-1} b_k, k = 1, \ldots, K$.<br>Step 5: Residual Error Check<br><br>a) Check the change on the total residue error<br>b) Propagate the new coefficient set $\{c_k \mid k = 1, \ldots, K\}$ to data sources 12a-12c or send a message to stop the reiteration on data sources 12a-12c. |
| Step 6: Process Continuation<br><br>a) Stop the iterative process when a termination message is received from central station 14; OR<br>b) Compute a change in harmonic averages for the previous selected functions<br>c) Repeat steps 2-6 when the harmonic averages are above a predetermined value and stop the iterative process when the harmonic averages are less than a predetermined value | |

The above discussion is meant to be illustrative of the principles and various embodiments of the present invention. Numerous variations and modifications will become apparent to those skilled in the art once the above disclosure is fully appreciated. For example, the systems and methods described herein may be incorporated within any type of data system, including those with distributed data and non-distributed data. It is intended that the following claims be interpreted to embrace all such variations and modifications.

What is claimed is:

1. A method, comprising:
a processor which performs the following:
selecting a set number of functions correlating variable parameters of a dataset; and
clustering the dataset by iteratively applying a regression algorithm and a K-Harmonic Means performance function on the set number of functions to determine a pattern in said dataset;
wherein said clustering comprises determining distances between data points of the dataset and values correlated with the set number of functions, regressing the set number of functions using data point probability and weighting factors associated with the determined distances, calculating a difference of harmonic averages for the distances determined prior to and subsequent to said regressing, and repeating said regressing, determining and calculating upon determining the difference of harmonic averages is greater than a predetermined value.

2. The processor-based method of claim 1, wherein said determining the distances comprises determining distances from each datapoint of the dataset to values within each function of the set number of functions.

3. The processor-based method of claim 1, wherein said selecting and said clustering are conducted for a plurality of datasets each from a different data source.

4. The processor-based method of claim 3, wherein said selecting and said clustering are conducted in parallel for each of the plurality of datasets.

5. The processor-based method of claim 3, further comprising determining a common coefficient vector to compensate for variations between similar sets of functions within the different data sources.

6. The processor-based method of claim 5, wherein said determining the common coefficient vector comprises:
developing matrices from the dataset datapoints and the probability and weighting factors for each of the datasets prior to said reiterating; and
determining the common coefficient vector from a composite of the developed matrices.

7. The processor-based method of claim 6, further comprising multiplying the similar sets of functions within the different data sources by the common coefficient vector.

8. A storage medium comprising program instructions executable by a processor for:
selecting a set number of functions correlating variable parameters of a dataset;
determining distances between datapoints of the dataset and values correlated with the set number of functions;
calculating harmonic averages of the distances;
regressing the set number of functions using datapoint probability and weighting factors associated with the determined distances;
repeating said determining and calculating for the regressed set of functions;
computing a change in harmonic averages for the set number of functions prior to and subsequent to said regressing; and
reiterating said regressing, repeating and computing upon determining the change in harmonic averages is greater than a predetermined value to thereby determine a pattern in said dataset.

9. The storage medium of claim 8, wherein the program instructions are executable using a processor for computing the datapoint probability and weighting factors.

10. The storage medium of claim 8, wherein the program instructions are executable using a processor for developing matrices from the dataset datapoints and the probability and weighting factors prior to said reiterating.

11. The storage medium of claim 10, wherein the program instructions are executable using a processor for amassing matrices developed from a plurality of datasets each from a different data source.

12. The storage medium of claim 10, wherein the program instructions are executable using a processor for determining a common coefficient vector from the composite of matrices.

13. The method of claim 12, wherein the program instructions are executable using a processor for multiplying similar sets of functions within the different data sources by the common coefficient vector.

14. A system, comprising:
an input port configured to receive data; and
a processor configured to:
regress functions correlating variable parameters of a set of the data;
cluster the functions using a K-Harmonic Mean performance function; and
repeat said regress and cluster sequentially to thereby determine a pattern in said set of data;
wherein the processor clusters the functions by determining distances between data points of the dataset and values correlated with a set number of functions, regressing the set number of functions using data point probability and weighting factors associated with the determined distances, calculating a difference of harmonic averages for the distances determined prior to and subsequent to said regressing.

15. The system of claim 14, wherein the processor is arranged within one of a plurality of data sources each comprising a processor configured to:
regress the functions on a dataset of the respective data source;
cluster the functions using a K-Harmonic Mean performance function; and
repeat said regress and cluster sequentially.

16. The system of claim 14, further comprising a central station coupled to the plurality of data sources, wherein the central station comprises a processor configured to compute common coefficient vectors which compensate for variations between the regressively clustered functions representing the datasets, and wherein each of the processors of the data sources is configured to alter the functions by the common coefficient vectors.

17. A system, comprising:
a plurality of data sources; and
a means for regressively clustering datapoints from the plurality of data sources without transferring data between the plurality of data sources to thereby determine a pattern in data contained in said data sources and for applying a K-Harmonic Means performance function on the data;
wherein the means for regressively clustering the datasets comprises a storage medium with program instructions executable using a processor for selecting a set number of functions correlating variable parameters of a dataset, determining distances between data points of the dataset and values correlated with the set number of functions, regressing the set number of functions using data point probability and weighting factors associated with the determined distances, calculating a difference of harmonic averages for the distances determined prior to and subsequent to said regressing; and reiterating said regressing, determining and calculating upon determining the difference of harmonic averages is less than a predetermined value.

18. The system of claim 17, further comprising a central station communicably coupled to the plurality of data sources, wherein the means is further for:

collecting dataset information at the central station from the plurality of data sources;

determining a common coefficient vector from the collected dataset information; and altering datasets within the plurality of data sources by the common coefficient vector.

19. A system, comprising:

a plurality of data sources each having a processor configured to access datapoints within the respective data source; and a central station coupled to the plurality of data sources and comprising a processor, wherein the processors of the central station and plurality of data sources are collectively configured to mine the datapoints of the data sources as a whole without transferring all of the datapoints between the data sources and the central station to thereby determine a pattern in datapoints contained in said data sources;

wherein the each of the processors within the plurality of data sources is configured to regressively cluster a dataset within the respective data source;

wherein the processor within the central station is configured to:

collect information pertaining to the regressively clustered datasets;

based upon the collected information, calculate common coefficient vectors which balance variations between functions correlating similar variable parameters of the regressively clustered datasets;

compute a residual error from the common coefficient vectors;

propagate the common coefficient vectors to the data sources upon computing a residual error value greater than a predetermined value; and send a message to the data sources to terminate the regression clustering of the datasets upon computing a residual error value less than a predetermined value.

20. A processor-based method for mining data, comprising:

independently applying a regression clustering algorithm to a plurality of distributed datasets by determining distances between data points of each dataset and values correlated with a set number of functions, regressing the set number of functions using data point probability and weighting factors associated with the determined distances, calculating a difference of harmonic averages for the distances determined prior to and subsequent to application of said regression algorithm, and repeating said regressing, determining and calculating upon determining the difference of harmonic averages is greater than a predetermined value;

developing matrices from probability and weighting factors computed from the regression clustering algorithm, wherein the matrices individually represent the distributed datasets without including all datapoints within the datasets;

determining global coefficient vectors from a composite of the matrices; and multiplying functions correlating similar variable parameters of the distributed datasets by the global coefficient vectors to thereby determine a pattern in said datasets.

21. The processor-based method of claim 20, further comprising repeating said independently applying, said developing, said determining and said multiplying.

22. The processor-based method of claim 20, further comprising calculating a residue error associated with the global coefficients prior to said multiplying.

* * * * *